UNITED STATES PATENT OFFICE.

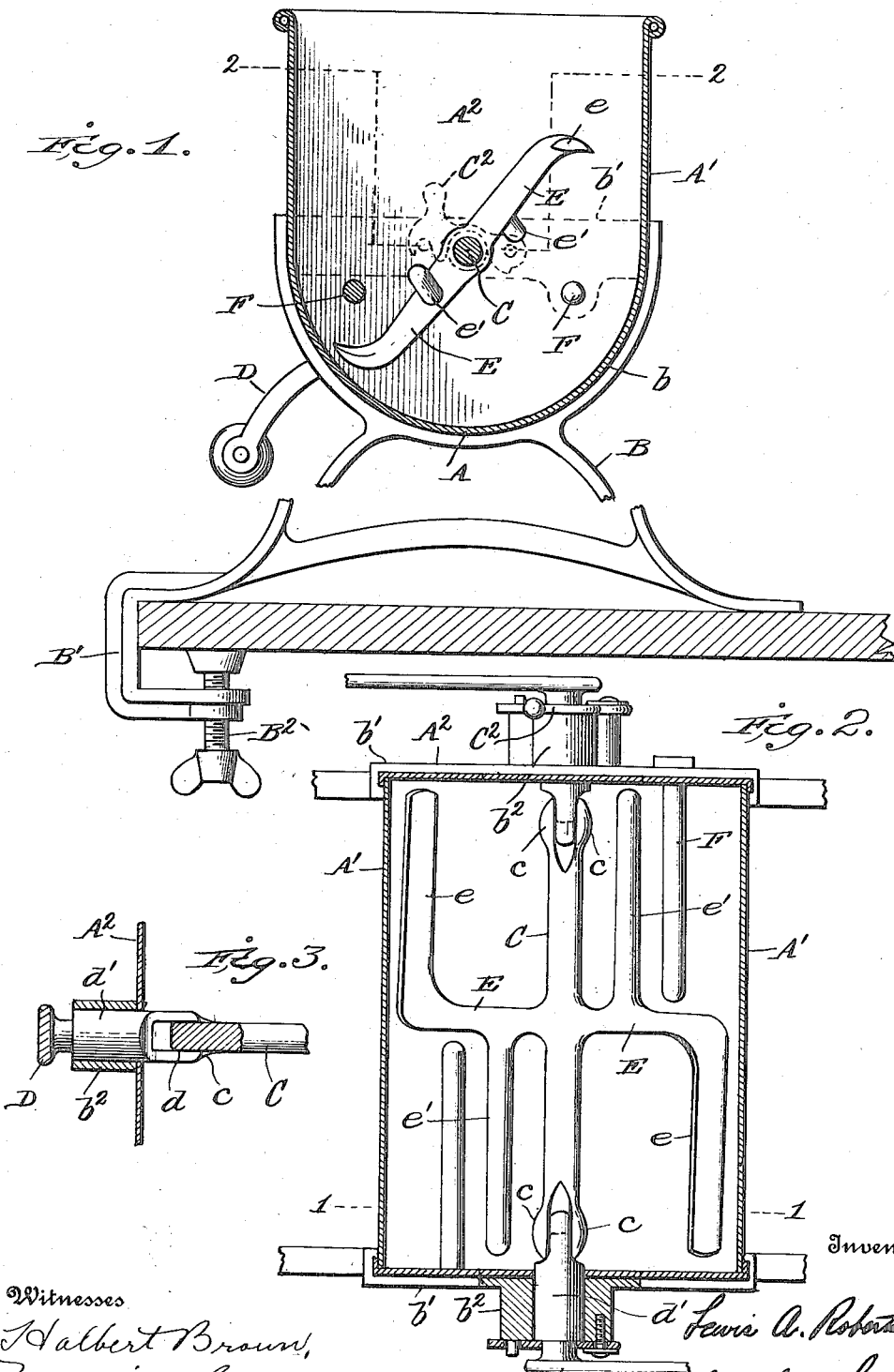

LEWIS A. ROBERTS, OF SCRANTON, PENNSYLVANIA.

BREAD-DOUGH-MIXING MACHINE.

1,123,595.                Specification of Letters Patent.        Patented Jan. 5, 1915.

Application filed May 13, 1912. Serial No. 696,086.

*To all whom it may concern:*

Be it known that I, LEWIS A. ROBERTS, of Scranton, in the county of Lackawanna and State of Pennsylvania, have invented a certain new and useful Improvement in Bread-Dough-Mixing Machines; and I do hereby declare the following to be a full, clear, and exact description of the same, reference being had to the accompanying drawings, forming a part of this specification, and to the figures and letters of reference marked thereon.

This invention relates to machines for mixing and kneading bread dough and more particularly to machines for domestic use designed with a view to saving a large part of the labor ordinarily expended in mixing and kneading batches of dough for domestic consumption, as well as to provide for a more thorough mixing and kneading than can be secured by ordinary hand manipulation.

A further object of the invention is to simplify and improve the construction of machines of this class, whereby the number of working parts will be reduced to a minimum, the cleaning of the machine facilitated, and the application of the power for operating the same made most economical and convenient for the housewife.

Referring to the accompanying drawings, Figure 1 is a section in a vertical plane, indicated by the line 1—1, Fig. 2, through a bread mixing and kneading machine embodying the present invention. Fig. 2 is a sectional plan view, the receptacle being shown in section in the plane indicated by the line 2—2 of Fig. 1. Fig. 3 is a detail of one of the shaft bearings and one end of the shaft.

Like letters of reference in both figures indicate the same parts.

The receptacle in which the ingredients are placed and in which the kneading operation is performed is preferably of sheet metal such as block tin and is formed with a semi-cylindrical bottom A, and substantially vertical side and end walls A', A², respectively. This receptacle is mounted in end frames B, each frame preferably having a semi-circular supporting flange $b$ in which the end of the bottom of the receptacle rests and a horizontal bar $b'$ having formed therein a journal bearing $b^2$. In addition, the end frames are preferably provided at the front of the machine with a downwardly and inwardly extending hook B' adapted to pass under the front edge of a table or shelf on which the machine is mounted and provided with a clamping screw B², whereby the machine will be held firmly against tipping toward the rear when rotary motion is imparted to the stirring and kneading devices, as will be hereinafter pointed out.

The shaft C extends longitudinally of the machine at approximately the center about which the circle of the bottom of the machine is struck. At the ends it is coupled to the cranks preferably by bifurcating the ends of the shaft to form projections $c$ which coöperate with longitudinal seats $d$ in the ends of the journal sections $d'$ of the crank handles D, working in the bearings $b^2$.

Pivoted latches C² on the end frames are employed to lock the journal sections of the shaft and handles D against endwise movement, as will be readily understood. By such construction the stirring and kneading appliances may be readily removed for cleaning by first releasing the catches and then drawing the journal sections of the shaft outwardly, thereby removing the supports for the intermediate portion of the shaft and stirrers so that the latter can be lifted out of the receptacle. The said stirring and kneading appliances which are mounted on the shaft may most conveniently be cast integral therewith and they consist, as shown, first, of oppositely arranged arms E projecting transversely of the shaft at a point substantially midway of its length, and each arm carrying fingers or projections $e$, $e'$ extending toward the ends of the receptacle and at an angle to the axis of the shaft. In the preferred arrangement the fingers or projections $e$, $e'$ on the arms incline forwardly with respect to the direction of rotation. The fingers $e$ which are located the greater distance from the shaft are preferably elongated or flattened in cross-section and travel in proximity to the circular bottom of the receptacle through the lower half of their revolution while the fingers $e'$ may be substantially circular in cross-section or in the form of pins which are inclined to the axis of rotation.

For coöperation with the fingers of the stirrer and kneader the end frames B are provided with inwardly projecting rods or pins F, so located with relation to the fingers or projections on the stirrer and kneader that they will pass between the fingers or projections e, e', respectively. These pins are preferably located below the horizontal bar b², by which it results that the fingers on the stirrer will pass the pins F, at different times, thus distributing the resistance through a greater arc of movement and correspondingly lessening the labor of operating the machine. The rods or pins F are preferably cast integral with the end frames B, although, as will be readily understood, they may, if desired, be mounted in suitable enlargements on the end frame and project into the receptacle at the proper points. They are preferably arranged parallel with the shaft C and practice has demonstrated that one pin or rod F at each end of the receptacle but located on opposite sides of the center are sufficient to accomplish the result desired.

In operation, it will be noted that the stirrer and kneader fingers pass the pins or rods with a wiping or shearing action, thus distributing the resistance throughout a greater angle of the rotation of the shaft and materially lightening the labor by reducing the mass of material to be acted on at any one instant at the points of greatest resistance, besides tending to draw the mass away from the ends of the receptacle.

In making use of the apparatus it is placed on the table or shelf in front of the operator with the hooks B' in position around the edge of the table and clamped. After the ingredients have been placed in the receptacle together with the water, etc., the operator grasps the two handles and proceeds to turn the mixer. The form of mixer is such that the ingredients will be thoroughly stirred and mixed although it is primarily designed for the effective kneading of the dough, whereby it is stretched and pulled so as to develop the gluten content and make it absorb its full capacity of water, etc. It will be understood, of course, that the kneading operation takes place after the dough has reached the proper condition and that in such kneading operation the dough is gathered on the fingers or arms of the kneader, pressed against the bottom of the receptacle during the time said arms are passing through the lower half of their revolution and is thoroughly pulled and stretched by the coöperation of the fingers and walls and fixed pins or rods, this pulling or stretching operation taking place mainly in the portion of the receptacle below the shaft.

By making the frames and kneader in integral castings not only is the cost of these parts reduced to a minimum, but they may be tinned or coated before being assembled and when assembled there will be no projecting bolt-heads, screw-threads, or sharp and inaccessible angles difficult of access or in which dirt may accumulate to contaminate future batches of dough.

Having thus described my invention, what I claim as new and desire to secure by Letters Patent of the United States, is:

1. In a bread dough mixer and kneader, the combination with the receptacle, pins projecting into said receptacle in opposite directions from its end walls and a kneader shaft mounted in said receptacle intermediate and above the horizontal plane in which both of said pins are located, of kneader arms mounted on said shaft at an intermediate point and on diametrically opposite sides of the shaft, kneader fingers carried by said arms and projecting in opposite directions toward the ends of the receptacle in position to pass successively in proximity to said pins, and crank handles having shaft journal sections coöperating with the kneader shaft for turning said shaft and kneader, substantially as described.

2. In a bread dough mixer and kneader, the combination with the receptacle, and kneader shaft removably mounted to rotate in said receptacle, of kneader arms integral with said shaft intermediate its ends and having kneader fingers thereon projecting toward the ends of the shaft in opposite directions, said fingers being inclined in their cylindrical paths of rotation and pins projecting substantially parallel with the shaft from each end of the receptacle and in position to coöperate with the kneader fingers in stretching and pulling the dough.

3. In a bread dough mixer and kneader, the combination with the receptacle and a shaft mounted to rotate therein, of kneader arms mounted on said shaft at an intermediate point in its length, kneader fingers projecting from said arms in opposite directions toward the ends of the shaft and inclined in opposite directions in their cylindrical paths of rotation, pins mounted in fixed position at the ends of the receptacle and projecting toward the kneader arms between the paths traversed by the fingers carried by said arms, the arrangement being such that the fingers and pins coöperate with a shearing action to stretch and pull the dough being kneaded.

4. In a bread dough mixer and kneader, the combination with a receptacle having a semi-cylindrical bottom, of end frames having the semi-circular flanges on which said receptacle rests, pins rigidly mounted on said frames and projecting through the end walls into the receptacle, kneader shaft having end journal sections journaled in said frames and extending longitudinally through the end walls of said receptacle, kneader arms mounted on said shaft intermediate its ends, fingers carried by said arms and projecting toward the ends of the shaft in position to coöperate with the inwardly projecting pins and oppositely disposed crank handles for rotating said shaft, substantially as described.

LEWIS A. ROBERTS.

Witnesses:
J. D. MASON,
CORINNE CHAPMAN.